(12) United States Patent
Cheng

(10) Patent No.: US 6,480,382 B2
(45) Date of Patent: Nov. 12, 2002

(54) COOLING DEVICE FOR HARD DISC

(76) Inventor: Henry Cheng, No. 5, Lane 121, Lung-Hsiao St., Gueishan Hsiang, Taoyuan Hsien (TW)

(*) Notice: Subject to any disclaimer, the term of this patent is extended or adjusted under 35 U.S.C. 154(b) by 0 days.

(21) Appl. No.: 10/138,323

(22) Filed: May 6, 2002

(65) Prior Publication Data

US 2002/0126450 A1 Sep. 12, 2002

Related U.S. Application Data

(63) Continuation of application No. 09/311,000, filed on May 13, 1999, now abandoned.

(30) Foreign Application Priority Data

Feb. 24, 1999 (TW) .......................................... 88202881

(51) Int. Cl.$^7$ ................................................ H05H 7/20
(52) U.S. Cl. .................. 361/695; 62/259.2; 360/97.02; 454/184
(58) Field of Search ........................... 360/97.01–97.04; 62/259.2; 361/683, 687, 694, 695; 454/184

(56) References Cited

U.S. PATENT DOCUMENTS 4,926,291 A * 5/1990 Sarraf ........................ 361/695
5,927,386 A * 7/1999 Lin .............................. 361/695

* cited by examiner

*Primary Examiner*—Gregory Thompson
(74) *Attorney, Agent, or Firm*—Michael D. Bednarek; Shaw Pittman LLP

(57) ABSTRACT

A cooling device for a hard disc. The cooling device is screwed to the hard disc by way of screw apertures provided on the bottom of the hard disc. The cooling device includes a housing, at least one cooling fan and at least one contact portion. The cooling fan is received in the housing. The contact portion is connected to the housing. The contact portion is in contact with the chip of the hard disc so that heat generated by the chip is absorbed by the contact portion and transmitted to the housing and then ventilated by the cooling fan.

9 Claims, 5 Drawing Sheets

US 6,480,382 B2

COOLING DEVICE FOR HARD DISC

This is a continuation of application Ser. No. 09/311,000, filed May 13, 1999 now abandoned.

BACKGROUND OF THE INVENTION

1. Field of the Invention

The present invention relates in general to a cooling device which is mounted on a conventional hard disc by means of the screw apertures on the bottom of the hard disc, without modifying the structure of the conventional hard disc or main frame.

2. Description of the Related Art

As shown in FIG. 1, the main frame 5 of a conventional computer has a cooling fan 51 mounted on its back to discharge hot air, thereby lowering the temperature inside.

Two elements, the CPU and hard disc in the main frame 5, easily generate a large quantity of heat. The CPU is cooled by another cooling fan (not shown) mounted thereon so that it keeps working stably. However, the hard disc 52 in the main frame 5 cannot be efficiently cooled. High temperature may cause the hard disc 52 to become unstable or even fail.

Therefore, German Utility Model No. 297 01 832.9 discloses a cooling device for a hard disc. As shown in FIG. 2, the cooling device includes fan assemblies 53 which are disposed in front of the hard disc 52 so as to directly ventilate the hard disc 52.

In the present invention, totally different cooling devices for a hard disc are provided. There is no need to modify the structure of the conventional hard disc or main frame in order to use the cooling devices of the present invention, making them superior to the design of the prior art.

SUMMARY OF THE INVENTION

An object of the present invention is to provide a cooling device that efficiently dissipates heat generated from a hard disc.

Another object of the present invention is to provide a cooling device which is mounted on a conventional hard disc by means of the screw apertures on the bottom of the hard disc, without modifying the structure of the conventional hard disc or main frame.

The cooling device of the present invention includes a body, at least one fin and at least one contact portion. The fin and the contact portion are connected to the body. The contact portion is in contact with a chip of a hard disc so that heat generated by the chip is absorbed by the contact portion and transmitted via the body to the fin and then dissipated. The body of the cooling device is screwed to the hard disc by way of screw apertures provided on the bottom of the hard disc.

Alternatively, the cooling device of the present invention includes a housing, at least one cooling fan and at least one contact portion. The cooling fan is received in the housing. The contact portion is connected to the housing. The contact portion is in contact with the chip of the hard disc so that heat generated by the chip is absorbed by the contact portion and transmitted to the housing and then ventilated by the cooling fan. The housing of the cooling device is screwed to the hard disc by way of screw apertures provided on the bottom of the hard disc.

Alternatively, the cooling device of the present invention includes a support frame and at least one cooling fan. The support frame is screwed to the hard disc by way of the screw apertures. The cooling fan is connected to the support frame so as to ventilate heat generated by the chip of the hard disc.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
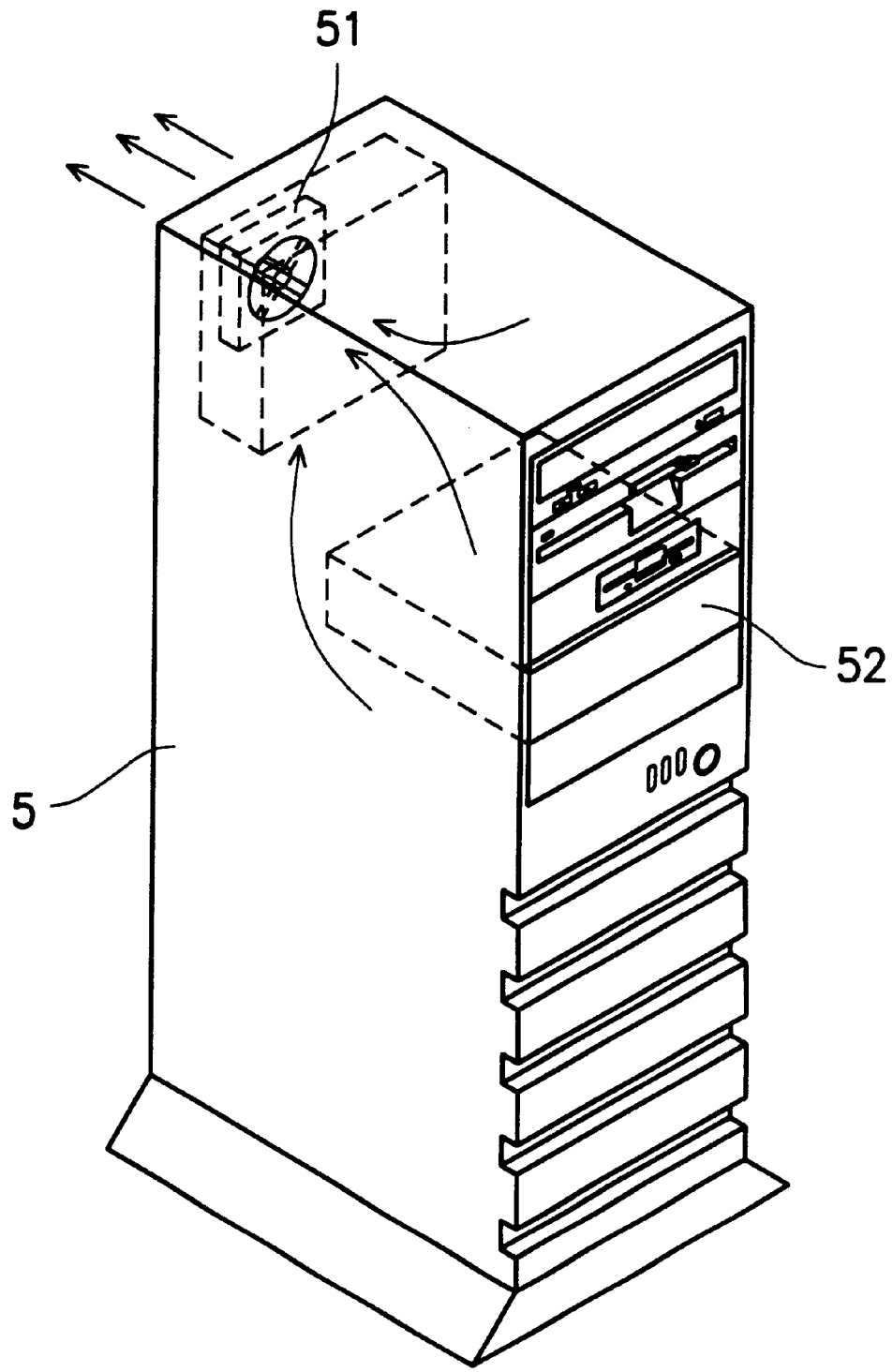
FIG. 1 is a perspective diagram of a main frame of a conventional computer.
Figure 2:
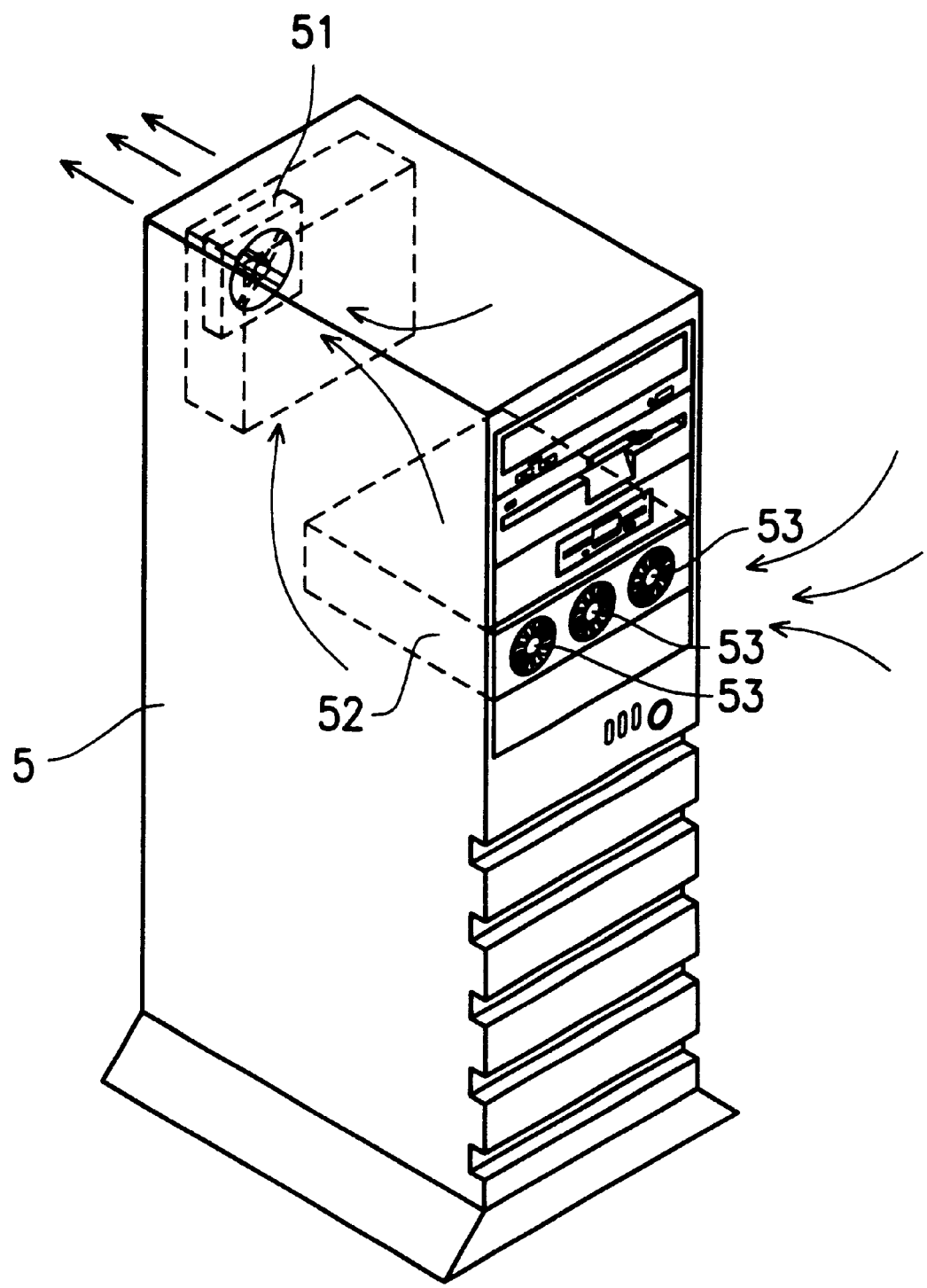
FIG. 2 is a perspective diagram of a main frame with the cooling device of German Utility Model No. 297 01 832.9 mounted thereon.
Figure 3:
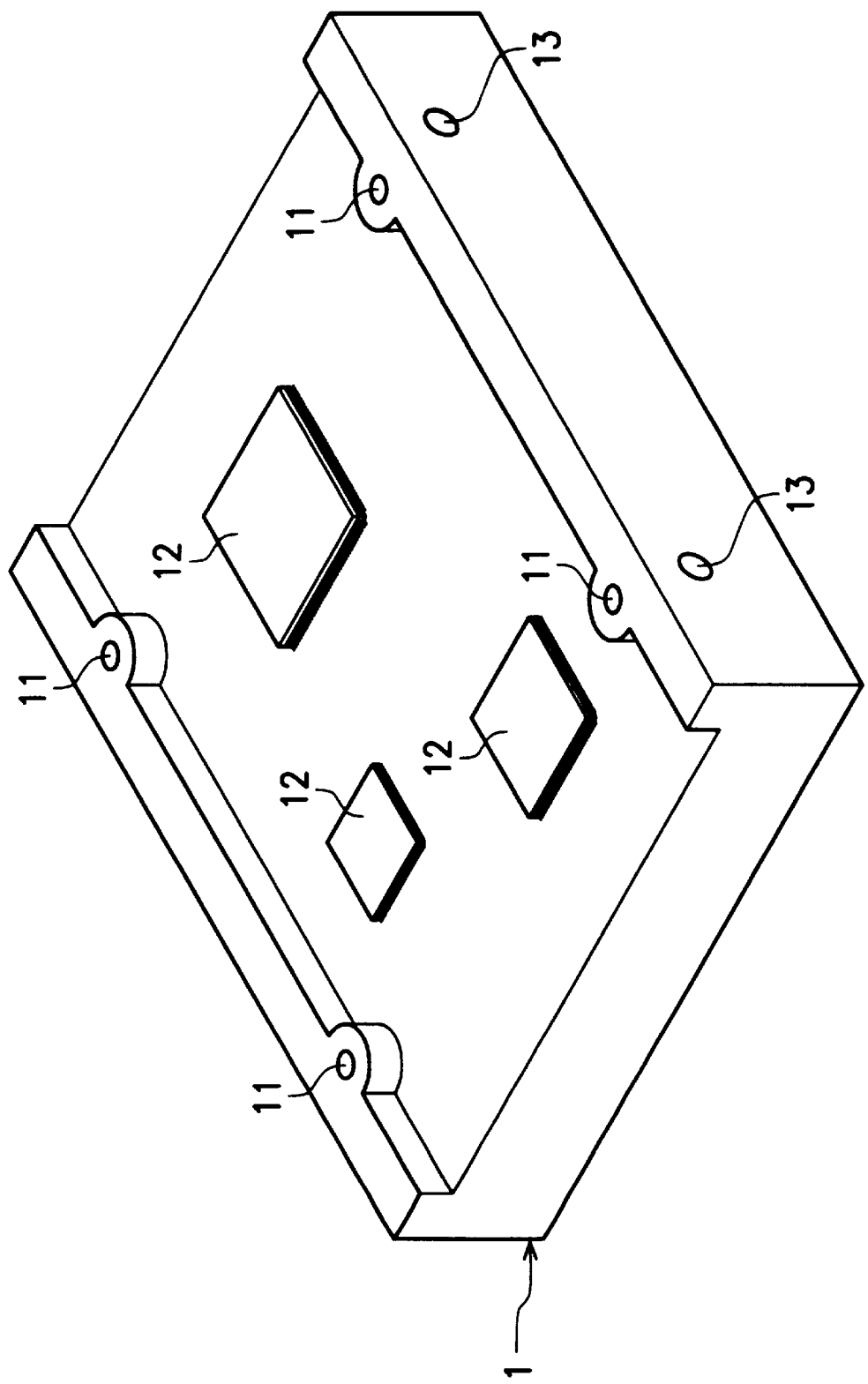
FIG. 3 is a perspective view of a conventional hard disc, observed from the bottom thereof.

FIG. 3 is a perspective view of a conventional hard disc, observed from the bottom thereof. Two groups of screw apertures 11, 13 are provided on the bottom and side surfaces of the hard disc, respectively. It is noted that the screw apertures 11 or 13 are selectively used for fixing the hard disc to the main frame of a computer. In the present invention, the screw apertures 11 on the bottom surface of the hard disc are used for fixing a cooling device, while the screw apertures 13 on the side surfaces are used for fixing the hard disc to the main frame.

Figure 4:
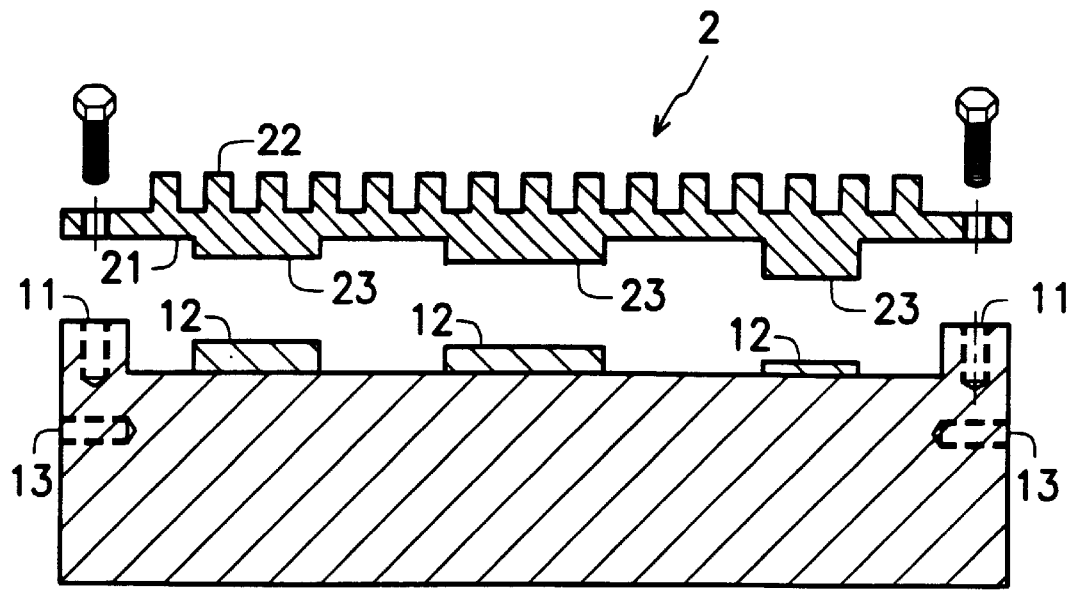
FIG. 4 depicts a cooling device in accordance with a first embodiment of the present invention.

In operation, the temperature of chips 12 of the hard disc is very high. FIG. 4 depicts a cooling device in accordance with a first embodiment of the present invention, in which the cooling device 2 is screwed to the hard disc by way of the screw apertures 11. The cooling device 2 has a body 21, contact portions 23 and fins 22. The contact portions 23 are of different thickness so as to directly contact the chips 12. Heat generated by the chips 12 is absorbed by the contact portions 23 and transmitted via the body 21 to the fins 22 and then dissipated.

Figure 5:
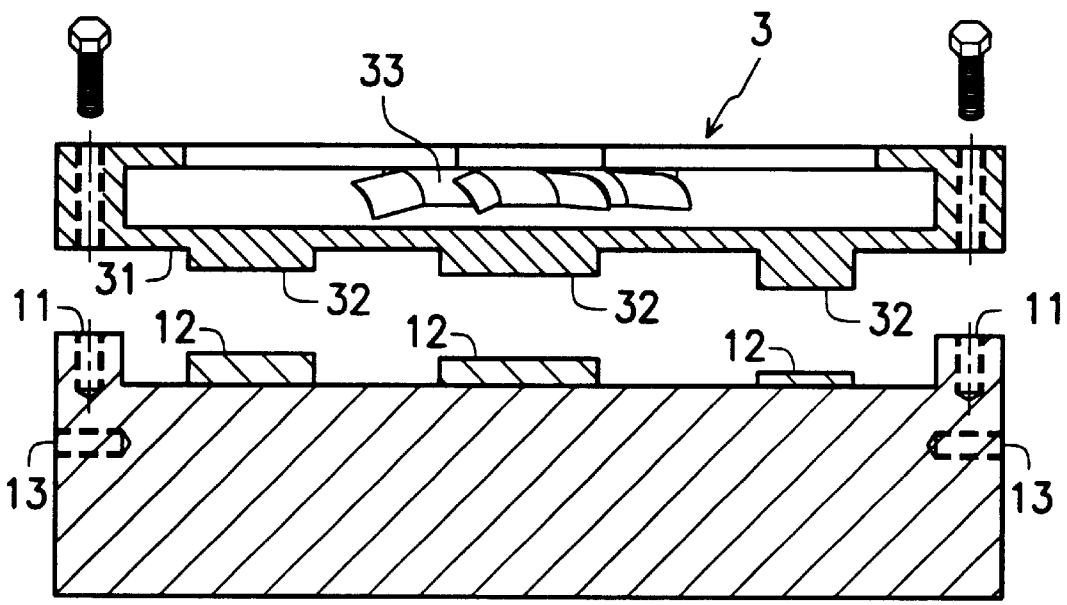
FIG. 5 depicts a cooling device in accordance with a second embodiment of the present invention.

FIG. 5 depicts a cooling device in accordance with a second embodiment of the present invention, in which the cooling device 3 is also screwed to the hard disc by way of the screw apertures 11. The cooling device 3 has a housing 31, contact portions 32 formed on the outer surface of the housing 31 and a cooling fan 33 received in the housing 31. The contact portions 32 are of different thickness so as to directly contact the chips 12. Heat generated by the chips 12 is absorbed by the contact portions 32 and transmitted to the housing 31 and then ventilated by the cooling fan 33.

Figure 6:
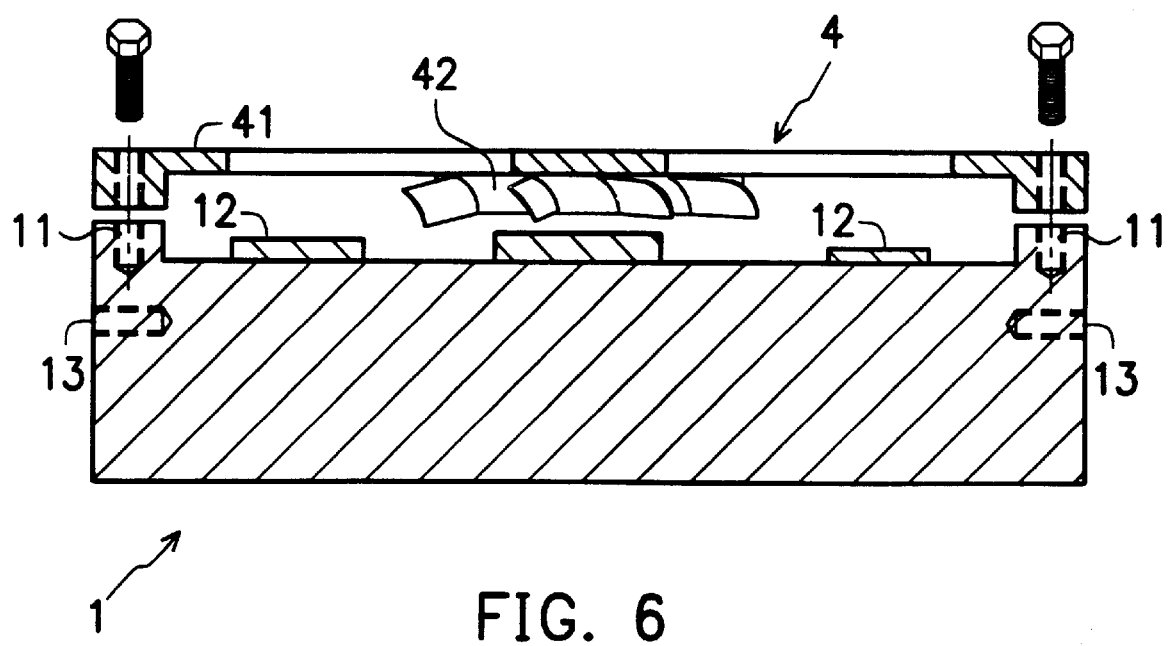
FIG. 6 depicts a cooling device in accordance with a third embodiment of the present invention.

FIG. 6 depicts a cooling device in accordance with a third embodiment of the present invention, in which the cooling device 4 is screwed to the hard disc by way of the screw apertures 11. The cooling device 4 has a support frame 41 and a cooling fan 42 fixed to the support frame 41. Then, heat generated by the chips 12 is ventilated by the cooling fan 42.

From the description above, it is known that the cooling device of the present invention is mounted on a conventional hard disc by means of the screw apertures provided on the bottom of the hard disc, without modifying the structure of the conventional hard disc or main frame.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer apparatus comprising:

a hard disc having a bottom surface with first screw apertures thereon;

a support frame disposed under the hard disc and mounted to the hard disc by fastening means disposed trough the support frame and the first screw apertures on the bottom surface of the hard disc; and at least one cooling fan fixed to the support frame.

2. The computer apparatus of claim 1, wherein the at least one cooling fan ventilates heat generated by the hard disc.

3. The computer apparatus of claim 2, wherein the hard disc further comprises at least one chip disposed on the bottom surface, and wherein the at least one cooling fan ventilates heat generated by the at least one chip.

4. The computer apparatus of claim 1, further comprising a computer main frame, wherein the hard disc with the support frame mounted thereon is mounted on the computer main frame without requiring modification of the hard disc and without requiring modification of the computer main frame.

5. The computer apparatus of claim 4, wherein the hard disc further comprises side surfaces with second screw apertures thereon, and wherein the hard disc is mounted on the computer main frame using second fastening means disposed through the computer main frame and the second screw apertures on the side surfaces.

6. A computer apparatus comprising:

a computer main frame;

a hard disc having a bottom surface with first screw apertures thereon and a side surface with second screw apertures thereon;

a support frame mounted to the hard disc by first fastening means disposed through the support frame and the first screw apertures on the bottom surface of the hard disc, wherein the hard disc is mounted to the computer main frame by second fasten means disposed through the computer main frame and the second screw apertures on the side surface of the hard disc; and at least one cooling fan fixed to the support frame.

7. The computer apparatus of claim 6, wherein the support frame mounts to the hard disc without structurally modifying the hard disc and without structurally modifying the computer main frame.

8. The computer apparatus of claim 6, wherein the at least one cooling fan ventilates heat generated by the bard disc.

9. The computer apparatus of claim 6, wherein the hard disc further comprises at least one chip disposed on the bottom surface, and wherein the at least one cooling fan ventilates heat generated by the at least one chip.

* * * * *